United States Patent [19]
Iida

[11] 3,731,997
[45] May 8, 1973

[54] FILM COUNTER DEVICE FOR MOTION PICTURE CAMERAS

[75] Inventor: Yozo Iida, Tokyo, Japan

[73] Assignee: Nippon Kogaku K.K., Tokyo, Japan

[22] Filed: Sept. 29, 1971

[21] Appl. No.: 184,783

[30] Foreign Application Priority Data

Sept. 30, 1970 Japan ................................ 45/96786

[52] U.S. Cl. .................................................. 352/91
[51] Int. Cl. ............................................. G03b 21/36
[58] Field of Search .......................................... 352/91

[56] References Cited

UNITED STATES PATENTS

| 3,582,198 | 6/1971 | Reinsch | 352/91 |
| 3,494,691 | 2/1970 | Katsuyama | 352/91 |
| 3,606,529 | 9/1971 | Reinsch et al. | 352/91 |

*Primary Examiner*—Samuel S. Matthews
*Assistant Examiner*—Russell E. Adams, Jr.
*Attorney*—Joseph M. Fitzpatrick et al.

[57] ABSTRACT

A motion picture camera film counter device which enables film once exposed to be rewound and supplied for a second exposure by exactly the same amount as that subject to the first exposure. The film counter device is characterized by a normal-reverse rotation change-over switch for changing over a motor circuit between a normal rotation mode and a reverse rotation mode with the aid of brushes connected in the motor circuit and cooperable with an electrically conductive member and its insulators provided on a counter member mounted for rotation on a shaft member, the counter member being engaged with and disengaged from a clutch member in response to the mode of the change-over switch.

6 Claims, 5 Drawing Figures

PATENTED MAY 8 1973

3,731,997

FILM COUNTER DEVICE FOR MOTION PICTURE CAMERAS

BACKGROUND OF THE INVENTION

1. Field of the INvention

This invention relates in general to camera accessories, and more particularly to film counters for motion picture cameras.

2. Description of the Prior Art

Various types of motion picture cameras have already been proposed which are equipped with a film counter useful for accomplishing special photographic techniques known as the "double shot" and the "overlap shot". The double shot is a technique whereby a length of film once exposed is rewound and then subjected to a second exposure; and the overlap shot is a technique whereby fade-in and fade-out are effected in overlapping relationship on the same length of film. Conventional film counters have enabled a length of film once subjected to a first exposure to be rewound for a second exposure; but they have not been able to supply the same length of film for the second exposure as that subjected to the first exposure. With such conventional film counters, it has therefore been impossible to superimpose characters such as titles or the like through the use of the double shot technique, and thereafter smoothly to shift into a normal photographing operation without waste of film. Instead, it has been required that characters such as titles or the like be photographed through other than the double shot technique, and the exposed film be edited after development, as by cutting off the portion of the film carrying such title characters and rejoining it to the film.

SUMMARY OF THE INVENTION

The present invention intends to eliminate the foregoing disadvantages peculiar to the prior art and to provide a film counter which enables film to be rewound and supplied for a second exposure by exactly the same amount of film length as that subjected to a first exposure.

To achieve this object, the film counter of the present invention comprises a shaft member having one end projected outwardly of a camera body and the other end fixed to the camera body or half-fixed thereto by means of a friction generating member, the projected end face of the shaft member being provided with indicator means. A counter member is rotatably mounted on the shaft member. The counter member has at one end an electrically conductive member provided with insulating portions at predetermined locations thereof, and has at the other end a counter scale cooperable with the indicator means of the shaft member. A brush is provided which has one end selectively engageable with the electrically conductive member and the insulating portions thereof, and has the other end secured to the shaft member with an insulating member interposed therebetween. The brush is directed to form a normal rotation motor circuit. A normal-reverse rotation change-over switch is provided for changing over a motor circuit between a normal rotation mode and a reverse rotation mode. A brush is connected in the reverse rotation mode of the motor circuit and selectively engageable with the electrically conductive member and the insulating portions thereof. A further brush is connected commonly in the normal and reverse rotation modes of the motor circuit and always engaged with the electrically conductive member. A clutch member is provided which is operatively associated with a film driving system, and a connecting member is provided for engaging and disengaging the clutch member with the counter member in response to the normal-reverse rotation change-over switch. The counter member may be in the form of a gear or a rack.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

DESCRIPTION OF THE PREFERRED EMBODIMENT

Figure 1:
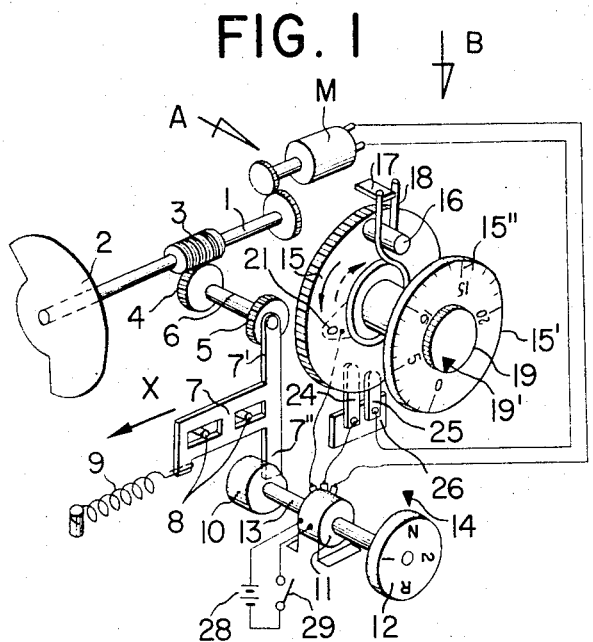
FIG. 1 is a schematic perspective view of the film counter device according to an embodiment of the present invention.

Referring to FIG. 1, reference numeral 1 designates a shutter shaft driven from a reversible motor M to operate a film feed pawl (not shown) through a known means so as to transport a film in take-up or rewind direction. The shutter shaft 1 has a shutter section 2 and a worm gear 3 mounted thereon. The worm gear 3 is always engaged by a worm wheel 4, which is connected to a clutch gear 5 by a shaft 6 rotatably supported on a support arm 7' upwardly extending from a slide plate 7. The worm wheel 4 and the clutch gear 5 are rotatable together on the shaft 6; and the clutch gear 5 is engageable with a counter gear 15, which will be further described. The slide plate 7 may be guided linearly in a direction parallel to the axial direction of the shutter shaft 1 by pins 8 studded in a fixed portion of the camera body (not shown in FIG. 1). The slide plate 7 is normally biased in the direction of the arrow X by a spring 9. A cylindrical cam 10, a normal-reverse rotation change-over switch 11 having change-over means therein, and a change-over dial 12 are connected together by a common shaft 13 so that rotation of the dial 12 causes movement of the change-over means in the change-over switch 11 and of the cylindrical cam 10. The change-over dial 12 has marks "1", "N", "2" and "R" on the outer face thereof. These marks are cooperable with a fixed reference index 14.

As shown in FIG. 1, the cylindrical cam 10 is so constructed that it moves the slide plate 7 to the left, as viewed, so as to disengage the clutch gear 5 from the counter gear 15 when the dial 12 is rotated to register its mark "N" with the reference index 14; and that it moves the slide plate 7 to the right, as viewed, so as to bring the clutch gear 5 into engagement with the counter gear 15 when the dial 12 is rotated to register its mark "R" with the reference index 14. The cylindrical cam 10 is also so-constructed that it moves the slide plate 7 to the right, as viewed, to bring the clutch gear 5 into engagement with the counter gear 15 when the dial 12 is rotated to register its mark "1" or "2" with the reference index 14.

Figure 4:
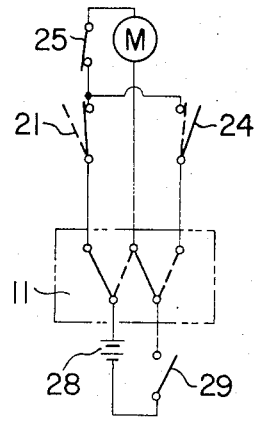
FIG. 4 is a diagram of the electric circuit in the device of the present invention.

The switch contacts (change-over means) in the normal-reverse rotation change-over switch 11 act such that when the mark "N" on the dial 12 is registered with the index 14, the electrical connection assumes a position for rotating the motor M in the normal direction, i.e., the film take-up direction (see the solid-line position in FIG. 4). This is also true when either mark "1" or "2" of the dial 12 is registered with the index 14. The switch contacts in the change-over switch 11 are also such that when the mark "R" on the dial 12 is registered with the reference index 14, the electrical connection assumes a position for rotating the motor M in the reverse direction, i.e., the film rewind direction (see the dashed-line position in FIG. 4).

The counter gear 15 is mounted on a shaft 19 for rotation thereon in either of the normal and reverse directions. The rotation of the counter gear 15 in the normal direction is represented as the solid-line arrow and the rotation in the reverse direction as the dashed-line arrow in FIGS. 1 and 2. The counter gear 15 has a pin 16 studded in one face thereof and an electrically conductive plate 20 attached to the other face (see FIGS. 2 and 3). Also mounted on the shaft 19 is a counter scale disc 15' having a scale 15" formed thereon. The counter gear 15 and the counter scale disc 15' may be formed integrally with each other, as shown in FIG. 3. A setting member 17, for setting the return position of the pin 16, is provided on a fixed portion of the camera body and has substantially the same width as the diameter of the pin 16. A torsion spring 18 is wound on the counter gear 15 with its opposite end portions crossing to hold the pin 16 and setting member 17 therebetween, as shown in FIG. 1. The shaft 19, carrying the counter gear 15 and scale disc 15', is rotatably mounted on the camera body 27 and held by a friction spring 30 (see FIG. 3). One end of the shaft 19 adjacent to the scale disc 15' is projected outwardly beyond the camera body so that it may be manually rotated into any desired position from outside of the camera and fixed in that position with respect to the camera body by the action of the friction spring 30. The outwardly projected end face of the shaft 19 has a reference index 19', which is cooperable with the counter scale 15" on the counter scale disc 15'.

The electrically conductive plate 20 attached to the other face of the counter gear 15 comprises an outer conductive portion 20" and an inner conductive portion 20'. The outer conductive portion 20" is path of engagement of the conductive plate 20 with a brush 25 to be described hereinafter. The inner conductive portion 20' is path of engagement of the conductive plate 20 with brushed 21 and 24 to be described hereinafter. Small insulating pieces 22 and 23 are provided on the inner conductive portion 20' of the conductive plate 20. The brushes 24 and 25 are secured to the camera body with the insulator 26 interposed therebetween. A tip end 25a of the brush 25 is always engaged with the outer conductive portion 20" so as to electrically be connected thereto and the other end is electrically connected with one of terminals of the motor M through a lead wire.

A tip end 24a of the brush 24 is selectively engaged with the inner conductive portion 20' and the insulating piece 23. The brush 24, as shown in circuit diagram of FIG. 4, is connected, on the one hand, with the one of the terminals of the motor M through the brush 25, and the other hand, with the reverse rotation circuit of the normal-reverse rotation change-over switch 11 through a lead wire.

Figure 2:
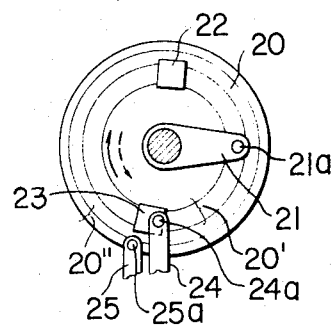
FIG. 2 is a view taken along the direction of arrow A in FIG. 1 and showing the counter gear portion.
Figure 3:
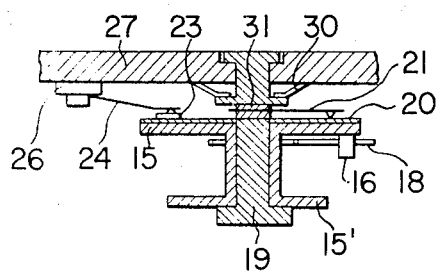
FIG. 3 is a cross-sectional view taken along the lines 3—3 of FIG. 1 and showing the camera body in section.

A brush 21 is secured to the shaft 19 in insulated relationship therewith by an insulating member 31, and the tip end 21a of the brush 21 is selectively engaged with the inner conductive portion 20' of the conductive plate 20 and the insulating piece 22 (see FIG. 2). The brush 21, as shown in the circuit diagram of FIG. 4, is connected, on the one hand, with the one of terminals of the motor M through the brush 25, and on the other hand, with the normal rotation circuit of the normal-reverse rotation change-over switch 11 through a lead wire. The other of the terminals of the motor M is electrically connected with commonly the normal and reverse rotation circuits of the change-over switch 11 through a lead wire. The brush 21 is engaged with the insulating piece 22 upon completion of a normal shot of double-shot photography, and the brush 24 is engaged with the insulating piece 23 (in FIG. 2) at the start of such normal shot. These small insulating pieces 22 and 23 cooperate with the conductive plate 20 and the brush 21 to provide a kind of time switch.

There is further provided a power source such as battery 28, and a start switch 29 operatively associated with the shutter release button or the like of a camera.

The operation of the device, according to the present invention, will now be described with respect to various photographic techniques.

NORMAL PHOTOGRAPHING

The change-over dial 12 is manually rotated until the mark "N" thereon is registered with the reference index 14. This causes the slide plate 7 to be moved to the left, as viewed, to disengage the clutch gear 5 from the counter gear 15, as in FIG. 1, while the normal-reverse rotation change-over switch 11 is caused to form a normal rotation circuit for rotating the motor M in the normal direction which is the film take-up direction. The brushes 21 and 25 are then in engagement with the inner and outer conductive portions 20' and 20" of the electrically conductive plate 20, respectively, as shown in FIG. 2. When the start switch 29 is now closed, the film take-up shaft (not shown) is rotated with the shutter shaft 1 and associated film feed pawl means (not shown), whereby the film is taken up for normal photographing.

DOUBLE-SHOT PHOTOGRAPHING

The change-over dial 12 is rotated until the mark "1" thereon is registered with the reference index 14. This causes the side plate 7 to be moved to the right, as viewed, to bring the clutch gear 5 into engagement with the counter gear 15 while the normal-reverse rotation changeover switch 11 is caused to form a normal rotation circuit for rotating the motor M in the normal direction, that is, the film take-up direction. The brushes 21 and 25 are then in engagement with the inner and outer conductive portions 20' and 20" to form a closed circuit, while the brush 24 is in engagement with the insulating member 23 to form an open circuit. When the start switch 29 is now closed, the film take-up shaft (not shown) is rotated with the shaft 1 and associated film feed pawl means (not shown) to thereby take up the film for a first normal photographing exposure (see FIG. 5). At this time, the counter gear 15 is also rotated in the normal direction (clockwise in FIG. 2), so that the pin 16 is rotated in the same direction against the force of the torsion spring 18. Soon thereafter, the insulating member 22 is engaged by the brush 21 to cut off the normal rotation circuit. Thus, the motor M is stopped to complete the first normal exposure. The length of the film subjected to the first normal exposure can be read through the division of the scale 15", indicated by the reference index 19'. The brush 24 is now out of engagement with the insulating member 23 and in engagement with the conductive portion 20'.

Figure 5:
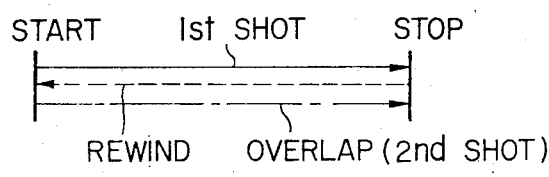
FIG. 5 is a chart for facilitating the understanding of the present invention.

Next, the dial 12 is rotated until its mark "R" is registered with the reference index 14. The slide plate 7 remains in the position which it assumed for the registration of the mark "1" with the index 14, and accordingly the clutch gear 5 remains in engagement with the counter gear 15. However, the normal-reverse rotation change-over switch 11 alone is changed over to form a reverse rotation circuit (dashed-line in FIG. 4) for rotating the motor M in the reverse direction, which is the film rewind direction. Moreover, the brush 24 is in engagement with the conductive portion 20'. Therefore, when the start switch 29 is now closed, the film take-up shaft and associated film feed pawl means are rotated in the reverse direction to rewind the film, as shown in FIG. 5. At the same time, the counter gear 15 is also rotated in the reverse direction (counter-clockwise in FIG. 2), and accordingly the pin 16 thereon is rotated in the same direction. Soon thereafter, the insulating member 23 is engaged by the brush 24 to cut off the reverse rotation circuit. Thus, the motor M is stopped and the film has been rewound to the start position of the first exposure. The length of film thus rewound is equal to the length of film subjected to the first exposure and the start position of the first exposure is exactly in accord with the terminal position of the rewound length of film. At this time, the brush 21 is out of engagement with the insulating member 22 and in engagement with the inner conductive portion 20' of the electrically conductive plate 20. Further rotation of the change-over dial 12 to register its mark "2" (or "1") with the reference index 14 allows the slide plate 7 to remain unchanged similarly to the above-described case, so that the clutch gear 5 maintains its engagement with the counter gear 15. However, the normal-reverse rotation change-over switch 11 alone is changed over to form a normal rotation circuit (solid-line in FIG. 4) for rotating the motor M in the normal direction which is the film take-up direction. Moreover, the brush 21 is then in engagement with the conductive portion 20' of the electrically conductive plate 20. Thus, when the start switch 29 is now closed, the film take-up shaft (not shown) and associated film feed pawl means are rotated in the normal direction to take up the film for a second or overlap exposure (see FIG. 5). At the same time, the counter gear 15 is also rotated in the normal direction, and accordingly the pin 16 thereon is rotated in the same direction against the force of the torsion spring 18. Soon thereafter, the insulating member 22 is engaged by the brush 21 to cut off the normal rotation circuit. Thus, the motor M is stopped to complete the second exposure. The length of film subjected to the second exposure can be read through the division of the counter scale 15", indicated by the reference index 19'. Such length of film is equal to the length of film subjected to the first exposure and the stop position of the film is exactly in accord with the terminal position of the first exposure (see FIG. 5).

If a further scene is to be photographed, the changeover dial 12 may be rotated until its mark "N" is registered with the reference index 14, whereby the clutch gear 5 is disengaged from the counter gear 15 in the manner described, to allow the counter gear 15 to be returned to its initial position by the force of the spring 18, and the brush 21 is engaged with the outer conductive portion 20", while the brush 24 is brought into engagement with the insulator 23 on the inner conductive portion 20'. Closing the start switch 29 will enable another normal exposure to be effected in the manner described above.

The length of film to be subjected to the described double-shot technique may be pre-selected to any desired value by manually rotating the outwardly projected shaft 19 to set the brush 21 to any desired position. Further, the counter gear 15 may, of course, be replaced by a linearly moving counter member having rack or the like which is engageable with the clutch gear 5'.

It will thus be appreciated that, according to the present invention, the film once subjected to exposure may be rewound and then taken up for a second exposure without a slightest difference in the length of film between the first and the second exposure. This readily enables a subsequent photographing action to occur without causing any waste of film material, and accordingly without the necessity of editing the film later. Moreover, the length of film for double-exposure photographing may be preset as desired, and the film transportation is automatically stopped in accordance with the preset position of the film. These advantages represent a great convenience in use.

I claim:

1. An automatic control device for taking up and rewinding a film in a motion picture camera by rotating a motor comprising:

a movable member movable in one direction for an original position to a second position upon the take-up operation for double-exposure photography and in the opposite direction from the second position to the original position upon the rewinding operation for double-exposure photography;

clutch means engageable with and disengageable from the movable member so as to transmit movement of film transfer mechanism drive by the motor to the movable member or to interrupt the transmission;

a first circuit for energizing the motor to rotate in the take-up direction, including the motor, a pair of first contacts and first switch means connected between the motor and the first contacts, said first switch means opening the first circuit to de-energize the motor only when the movable member is at the second position;

a second circuit for energizing the motor to rotate in the rewinding direction, including the motor, a pair of second contacts and second switch means connected between the motor and the second contacts, said second switch means opening the second circuit to de-energize the motor only when the movable member is at the original position;

spring means for biasing the movable member toward original position; and a manually operable member for selectively connecting the first contacts to each other and the second contacts to each other, engaging the clutch means with the movable member upon double-exposure photography and disengaging the former from the latter upon normal photography; and means for manually adjusting the distance between the original position and the second position to vary the amount of the film fed for the double exposure photography.

2. An automatic control device according to claim 1, further comprising first and second support members, one of said first and second support members being movable in unison with said movable member, the other of said first and second support members being fixed on the camera body, and wherein said first switch means includes an electrically first conductive member (20') supported on said first support member:

a first insulating member (22) supported on said first support member and adjacent to said first conductive member; and an electrically second conductive member (21) supported on said second support member, said second conductive member coming selectively in contact with said first insulating member to open the first circuit when said movable member is at the second position, and with said first conductive member to close the first circuit, said second switch means includes an electrically third conductive member (20') supported on said first support member;

a second insulating member (23) supported on said first support member and adjacent to said third conductive member: and an electrically fourth conductive member (24) supported on said second support member, said fourth conductive member coming selectively in contact with said second insulating member to open the second circuit when said movable member is at the original position, and with said third conductive member to close the second circuit; and said distance adjusting means includes manual adjust means (19) for varying the distance between said second conductive member and said first insulating member.

3. An automatic control device according to claim 2, wherein said one of said first and second support members is said first support member.

4. An automatic control device according to claim 3, wherein said movable member serves as said first support member, and camera body serves as said second support member.

5. An automatic control device according to claim 4, wherein said manual adjust means is connected to said second conductive member for moving it to vary the distance between said second conductive member and said first insulating member.

6. An automatic control device for taking up and rewinding a film in a motion picture camera by rotating a motor comprising;

a movable member in one direction from an original position to a second position upon the take-up operation for double-exposure photography and in the opposite direction from the second position to the original position upon the rewinding operation for double-exposure photography;

clutch means engageable with and disengageable from the movable member so as to transmit movement of film transfer mechanism driven by the motor to the movable member or to interrupt the transmission;

a first circuit for energizing the motor to rotate in the take-up direction, including the motor, a pair of first contacts and first switch means connected between the motor and the first contacts, said first switch means opening the first circuit to de-energize the motor only when the movable member is at the second position;

a second circuit for energizing the motor to rotate in the rewinding direction, including the motor, a pair of second contacts and second switch means connected between the motor and the second contacts, said second switch means opening the second circuit to de-energize the motor only when the movable member is at the original position;

spring means for biasing the movable member toward original position; and a manually operable member for selectively connecting the first contacts to each other and the second contacts to each other, engaging the clutch means with the movable member upon double-exposure photography and disengaging the former from the latter upon normal photography, the first switch means being composed of an electrically first conductive member fixed on the movable member, an insulating member fixed on the movable member and adjacent to the first conductive member and an electrically second conductive member mounted in the camera body, the second conductive member coming selectively in contact with the first conductive member to close the first circuit and the insulating member to open the first circuit in response to movement of the movable member, and the second switch means being composed of an electrically third conductive member fixed on the movable member, a second insulating member fixed on the movable member and adjacent to the third conductive member and an electrically fourth conductive member mounted in the camera body, the fourth conductive member coming selectively in contact with the third conductive member to close the second circuit and the second insulating member to open the second circuit in response to the movement of the movable member, the second conductive member being adjustable from outward of the camera body to vary the distance between the second conductive member and the insulating member to thereby vary the amount of the film fed for the double-exposure photography.

* * * * *